US006850626B2

(12) United States Patent
Rhoads et al.

(10) Patent No.: US 6,850,626 B2
(45) Date of Patent: Feb. 1, 2005

(54) METHODS EMPLOYING MULTIPLE WATERMARKS

(75) Inventors: Geoffrey B. Rhoads, West Linn, OR (US); Ammon E. Gustafson, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 42 days.

(21) Appl. No.: 10/113,910

(22) Filed: Mar. 28, 2002

(65) Prior Publication Data

US 2002/0181735 A1 Dec. 5, 2002

Related U.S. Application Data

(60) Division of application No. 09/498,223, filed on Feb. 3, 2000, now Pat. No. 6,574,350, which is a continuation-in-part of application No. 09/287,940, filed on Apr. 7, 1999, now Pat. No. 6,580,819, said application No. 09/498,223, filed on Feb. 3, 2000, now Pat. No. 6,574,350, and a continuation of application No. 09/433,104, filed on Nov. 3, 1999, now Pat. No. 6,636,615, which is a continuation-in-part of application No. 09/234,780, filed on Jan. 20, 1999, now abandoned, application No. 10/113,910, which is a continuation-in-part of application No. 09/574,726, filed on May 18, 2000.
(60) Provisional application No. 60/082,228, filed on Apr. 16, 1998, provisional application No. 60/071,983, filed on Jan. 20, 1998, and provisional application No. 60/134,782, filed on May 19, 1999.

(51) Int. Cl.[7] .............................................. G06K 9/00
(52) U.S. Cl. ..................................... 382/100; 358/3.28
(58) Field of Search ................................ 382/100, 232, 382/162, 166, 244, 233, 135; 358/1.15, 1.18, 1.9, 3.28; 380/54, 200, 201, 28, 51; 705/58, 54; 713/176

(56) References Cited

U.S. PATENT DOCUMENTS

| 3,493,674 A | 2/1970 | Houghton |
| 3,569,619 A | 3/1971 | Simjian ........................ 235/380 |
| 3,576,369 A | 4/1971 | Wick et al. |
| 3,585,290 A | 6/1971 | Sanford |
| 3,655,162 A | 4/1972 | Yamamoto et al. |
| 3,703,628 A | 11/1972 | Philipson, Jr. |
| 3,809,806 A | 5/1974 | Walker et al. |
| 3,838,444 A | 9/1974 | Loughlin et al. |
| 3,914,877 A | 10/1975 | Hines |
| 3,922,074 A | 11/1975 | Ikegami et al. |
| 3,971,917 A | 7/1976 | Maddox et al. |
| 3,977,785 A | 8/1976 | Harris |
| 3,982,064 A | 9/1976 | Barnaby |

(List continued on next page.)

FOREIGN PATENT DOCUMENTS

| CA | 2235002 | 12/1998 |
| DE | 29 43 436 | 5/1981 |
| DE | 3806411 | 9/1989 |
| DE | 19521969 C1 | 2/1997 |
| EP | 366381 A2 | 10/1989 |
| EP | 372 601 | 6/1990 |

(List continued on next page.)

OTHER PUBLICATIONS

Ruanaidh et al., "Watermarking Digital Images for Copyright Protection", IEE Proc. Vis. Image Signal Process., vol. 143, Aug. 1996, pp. 250–256.*
Swanson et al., "Transparent Robust Image Watermarking", IEEE 1996, University of Minnesota, pp. 211–214.*
Arthur, "Digital Fingerprints Protect Artwork," *New Scientist*, Nov. 12, 1994, p. 24.
Bender et al., "Applications for Data Hiding," IBM Systems Journal, vol. 39, Nos. 3&4, 2000, pp. 547–568.

(List continued on next page.)

*Primary Examiner*—Yon J. Couso
(74) *Attorney, Agent, or Firm*—Digimarc Corporation

(57) ABSTRACT

Image, video, or audio data is encoded with both a frail and a robust watermark. The two watermarks respond differently to different forms of processing (e.g., copying the object may render the frail watermark unreadable), permitting an original object to be distinguished from a processed object. Appropriate action can then taken in response thereto.

23 Claims, 3 Drawing Sheets

U.S. PATENT DOCUMENTS

| | | |
|---|---|---|
| 3,984,624 A | 10/1976 | Waggener |
| 4,025,851 A | 5/1977 | Haselwood et al. |
| 4,184,700 A | 1/1980 | Greenaway |
| 4,225,967 A | 9/1980 | Miwa et al. |
| 4,230,990 A | 10/1980 | Lert, Jr. et al. ............... 725/22 |
| 4,231,113 A | 10/1980 | Blasbalg |
| 4,238,849 A | 12/1980 | Gassmann |
| 4,252,995 A | 2/1981 | Schmidt et al. |
| 4,262,329 A | 4/1981 | Bright et al. |
| 4,296,326 A | 10/1981 | Haslop et al. ................ 283/70 |
| 4,297,729 A | 10/1981 | Steynor et al. ............... 360/40 |
| 4,313,197 A | 1/1982 | Maxemchuk |
| 4,367,488 A | 1/1983 | Leventer et al. |
| 4,379,947 A | 4/1983 | Warner |
| 4,380,027 A | 4/1983 | Leventer et al. |
| 4,389,671 A | 6/1983 | Posner et al. |
| 4,395,600 A | 7/1983 | Lundy et al. |
| 4,416,001 A | 11/1983 | Ackerman |
| 4,423,415 A | 12/1983 | Goldman |
| 4,425,642 A | 1/1984 | Moses et al. |
| 4,476,468 A | 10/1984 | Goldman |
| 4,528,588 A | 7/1985 | Löfberg |
| 4,532,508 A | 7/1985 | Ruell |
| 4,547,804 A | 10/1985 | Greenberg |
| 4,553,261 A | 11/1985 | Froessl |
| 4,571,489 A | 2/1986 | Watanabe |
| 4,590,366 A | 5/1986 | Rothfjell |
| 4,595,950 A | 6/1986 | Lofberg |
| 4,618,257 A | 10/1986 | Bayne et al. ................. 356/71 |
| 4,637,051 A | 1/1987 | Clark |
| 4,639,779 A | 1/1987 | Greenberg |
| 4,647,974 A | 3/1987 | Butler et al. |
| 4,654,867 A | 3/1987 | Labedz et al. |
| 4,660,221 A | 4/1987 | Dlugos |
| 4,660,859 A | 4/1987 | Natesh |
| 4,663,518 A | 5/1987 | Borror et al. |
| 4,665,431 A | 5/1987 | Cooper |
| 4,672,605 A | 6/1987 | Hustig et al. |
| 4,675,746 A | 6/1987 | Tetrick et al. |
| 4,677,435 A | 6/1987 | Cause D'Agraives et al. |
| 4,682,794 A | 7/1987 | Margolin |
| 4,689,477 A | 8/1987 | Goldman |
| 4,703,476 A | 10/1987 | Howard |
| 4,712,103 A | 12/1987 | Gotanda |
| 4,718,106 A | 1/1988 | Weinblatt |
| 4,723,072 A | 2/1988 | Naruse |
| 4,723,149 A | 2/1988 | Harada |
| 4,739,377 A | 4/1988 | Allen |
| 4,750,173 A | 6/1988 | Blüthgen |
| 4,765,656 A | 8/1988 | Becker et al. |
| 4,775,901 A | 10/1988 | Nakano |
| 4,776,013 A | 10/1988 | Kafri et al. |
| 4,805,020 A | 2/1989 | Greenberg |
| 4,807,031 A | 2/1989 | Broughton et al. |
| 4,811,357 A | 3/1989 | Betts et al. |
| 4,811,408 A | 3/1989 | Goldman |
| 4,820,912 A | 4/1989 | Samyn |
| 4,835,517 A | 5/1989 | van der Gracht et al. |
| 4,855,827 A | 8/1989 | Best |
| 4,864,618 A | 9/1989 | Wright et al. |
| 4,866,771 A | 9/1989 | Bain |
| 4,874,936 A | 10/1989 | Chandler et al. |
| 4,876,617 A | 10/1989 | Best et al. |
| 4,879,747 A | 11/1989 | Leighton et al. ............ 713/186 |
| 4,884,139 A | 11/1989 | Pommier |
| 4,885,632 A | 12/1989 | Mabey et al. |
| 4,888,798 A | 12/1989 | Earnest ........................ 705/54 |
| 4,903,301 A | 2/1990 | Kondo et al. |
| 4,908,836 A | 3/1990 | Rushforth et al. |
| 4,908,873 A | 3/1990 | Philibert et al. ............ 382/100 |
| 4,918,484 A | 4/1990 | Ujiie et al. |
| 4,920,503 A | 4/1990 | Cook |
| 4,921,278 A | 5/1990 | Shiang et al. |
| 4,939,515 A | 7/1990 | Adelson |
| 4,941,150 A | 7/1990 | Iwasaki |
| 4,943,093 A | 7/1990 | Melling et al. |
| 4,943,973 A | 7/1990 | Werner |
| 4,943,976 A | 7/1990 | Ishigaki |
| 4,944,036 A | 7/1990 | Hyatt .......................... 367/43 |
| 4,947,028 A | 8/1990 | Gorog ........................ 235/380 |
| 4,963,998 A | 10/1990 | Maufe |
| 4,965,827 A | 10/1990 | McDonald |
| 4,967,273 A | 10/1990 | Greenberg |
| 4,969,041 A | 11/1990 | O'Grady et al. |
| 4,972,471 A | 11/1990 | Gross et al. |
| 4,972,475 A | 11/1990 | Sant'Anselmo |
| 4,972,476 A | 11/1990 | Nathans |
| 4,977,594 A | 12/1990 | Shear .......................... 705/53 |
| 4,979,210 A | 12/1990 | Nagata et al. |
| 4,996,530 A | 2/1991 | Hilton |
| 5,003,590 A | 3/1991 | Lechner et al. |
| 5,010,405 A | 4/1991 | Schreiber et al. |
| 5,023,907 A | 6/1991 | Johnson ..................... 710/200 |
| 5,027,401 A | 6/1991 | Soltesz ........................ 380/54 |
| 5,034,982 A | 7/1991 | Heninger et al. |
| 5,036,513 A | 7/1991 | Greenblatt |
| 5,040,059 A | 8/1991 | Leberl ........................ 348/135 |
| 5,053,956 A | 10/1991 | Donald ....................... 713/601 |
| 5,062,666 A | 11/1991 | Mowry et al. ................ 283/67 |
| 5,063,446 A | 11/1991 | Gibson |
| 5,073,899 A | 12/1991 | Collier et al. |
| 5,073,925 A | 12/1991 | Nagata et al. |
| 5,075,773 A | 12/1991 | Pullen et al. |
| 5,077,608 A | 12/1991 | Dubner |
| 5,077,795 A | 12/1991 | Rourke et al. |
| 5,079,648 A | 1/1992 | Maufe |
| 5,091,966 A | 2/1992 | Bloomberg et al. |
| 5,095,196 A | 3/1992 | Miyata ....................... 235/382 |
| 5,103,459 A | 4/1992 | Gilhousen et al. .......... 370/206 |
| 5,113,437 A | 5/1992 | Best |
| 5,113,445 A | 5/1992 | Wang .......................... 380/51 |
| 5,128,525 A | 7/1992 | Stearns et al. |
| 5,144,660 A | 9/1992 | Rose |
| 5,146,457 A | 9/1992 | Veldhuis et al. |
| 5,148,498 A | 9/1992 | Resnikoff et al. |
| 5,150,409 A | 9/1992 | Elsner |
| 5,161,210 A | 11/1992 | Druyvesteyn et al. |
| 5,166,676 A | 11/1992 | Milheiser |
| 5,168,147 A | 12/1992 | Bloomberg |
| 5,178,418 A | 1/1993 | Merry et al. |
| 5,181,786 A | 1/1993 | Hujink ......................... 400/61 |
| 5,185,736 A | 2/1993 | Tyrrell et al. |
| 5,199,081 A | 3/1993 | Saito et al. |
| 5,200,822 A | 4/1993 | Bronfin et al. ................ 725/22 |
| 5,212,551 A | 5/1993 | Conanan |
| 5,213,337 A | 5/1993 | Sherman ...................... 463/40 |
| 5,216,724 A | 6/1993 | Suzuki et al. ............... 382/135 |
| 5,228,056 A | 7/1993 | Schilling |
| 5,237,164 A | 8/1993 | Takada |
| 5,243,411 A | 9/1993 | Shirochi et al. |
| 5,243,423 A | 9/1993 | DeJean et al. |
| 5,245,165 A | 9/1993 | Zhang |
| 5,245,329 A | 9/1993 | Gokcebay |
| 5,247,364 A | 9/1993 | Banker et al. |
| 5,253,078 A | 10/1993 | Balkanski et al. |
| 5,257,119 A | 10/1993 | Funada et al. |
| 5,259,025 A | 11/1993 | Monroe ....................... 705/75 |
| 5,267,334 A | 11/1993 | Normille et al. |
| 5,280,537 A | 1/1994 | Sugiyama et al. .......... 370/529 |
| 5,284,364 A | 2/1994 | Jain |
| 5,288,976 A | 2/1994 | Citron ........................ 235/375 |

| | | | | | |
|---|---|---|---|---|---|
| 5,291,243 A | 3/1994 | Heckman et al. ............... 399/3 | 5,544,255 A | 8/1996 | Smithies et al. |
| 5,293,399 A | 3/1994 | Hefti | 5,548,646 A | 8/1996 | Aziz et al. |
| 5,295,203 A | 3/1994 | Krause et al. ............... 382/248 | 5,557,333 A | 9/1996 | Jungo et al. |
| 5,299,019 A | 3/1994 | Pack et al. | 5,559,559 A | 9/1996 | Jungo et al. |
| 5,305,400 A | 4/1994 | Butera | 5,568,179 A | 10/1996 | Diehl et al. |
| 5,315,098 A | 5/1994 | Tow ........................... 235/494 | 5,568,550 A | 10/1996 | Ur ............................. 382/306 |
| 5,319,453 A | 6/1994 | Copriviza et al. | 5,568,570 A | 10/1996 | Rabbani |
| 5,319,724 A | 6/1994 | Blonstein et al. | 5,572,010 A | 11/1996 | Petrie |
| 5,319,735 A | 6/1994 | Preuss et al. | 5,572,247 A | 11/1996 | Montgomery |
| 5,321,470 A | 6/1994 | Hasuo et al. ............... 399/366 | 5,576,532 A | 11/1996 | Hecht |
| 5,325,167 A | 6/1994 | Melen | 5,579,124 A | 11/1996 | Aijala et al. |
| 5,327,237 A | 7/1994 | Gerdes et al. | 5,582,103 A | 12/1996 | Tanaka et al. |
| 5,337,361 A | 8/1994 | Wang et al. | 5,587,743 A | 12/1996 | Montgomery |
| 5,337,362 A | 8/1994 | Gormish et al. | 5,590,197 A | 12/1996 | Chen et al. |
| 5,349,655 A | 9/1994 | Mann | 5,594,226 A | 1/1997 | Steger ........................ 235/379 |
| 5,351,302 A | 9/1994 | Leighton et al. | 5,598,526 A | 1/1997 | Daniel et al. ............... 345/540 |
| 5,354,097 A | 10/1994 | Tel | 5,602,920 A | 2/1997 | Bestler et al. |
| 5,371,792 A | 12/1994 | Asai et al. | 5,606,609 A | 2/1997 | Houser et al. |
| 5,374,976 A | 12/1994 | Spannenburg .............. 399/366 | 5,611,575 A | 3/1997 | Petrie |
| 5,379,345 A | 1/1995 | Greenberg | 5,613,004 A | 3/1997 | Cooperman et al. .......... 380/28 |
| 5,384,846 A | 1/1995 | Berson et al. | 5,613,012 A | 3/1997 | Hoffman et al. |
| 5,385,371 A | 1/1995 | Izawa | 5,614,940 A | 3/1997 | Cobbley et al. |
| 5,387,941 A | 2/1995 | Montgomery et al. | 5,617,119 A | 4/1997 | Briggs et al. |
| 5,390,003 A | 2/1995 | Yamaguchi et al. | 5,617,148 A | 4/1997 | Montgomery |
| 5,394,274 A | 2/1995 | Kahn | 5,629,770 A | 5/1997 | Brassil |
| 5,396,559 A | 3/1995 | McGrew | 5,629,980 A | 5/1997 | Stefik et al. |
| 5,398,283 A | 3/1995 | Virga | 5,636,292 A | 6/1997 | Rhoads |
| 5,404,160 A | 4/1995 | Schober et al. | 5,638,443 A | 6/1997 | Stefik .......................... 705/54 |
| 5,404,377 A | 4/1995 | Moses | 5,638,446 A | 6/1997 | Rubin |
| 5,408,542 A | 4/1995 | Callahan | 5,640,193 A | 6/1997 | Wellner ...................... 725/100 |
| 5,416,307 A | 5/1995 | Danek et al. ............... 235/449 | 5,646,997 A | 7/1997 | Barton |
| 5,418,853 A | 5/1995 | Kanota et al. | 5,646,999 A | 7/1997 | Saito ........................... 705/54 |
| 5,422,963 A | 6/1995 | Chen et al. | 5,652,626 A | 7/1997 | Kawakami et al. |
| 5,422,995 A | 6/1995 | Aoki et al. | 5,659,164 A | 8/1997 | Schmid ...................... 235/375 |
| 5,425,100 A | 6/1995 | Thomas et al. | 5,659,726 A | 8/1997 | Sandford, II et al. |
| 5,428,606 A | 6/1995 | Moskowitz | 5,661,574 A | 8/1997 | Kawana |
| 5,428,607 A | 6/1995 | Hiller et al. ................ 370/352 | 5,663,766 A | 9/1997 | Sizer, II |
| 5,428,731 A | 6/1995 | Powers .................... 707/501.1 | 5,664,018 A * | 9/1997 | Leighton ...................... 380/54 |
| 5,430,664 A | 7/1995 | Cargill et al. | 5,665,951 A | 9/1997 | Newman et al. ............ 235/375 |
| 5,432,542 A | 7/1995 | Thibadeau et al. | 5,666,487 A | 9/1997 | Goodman et al. |
| 5,432,870 A | 7/1995 | Schwartz | 5,668,636 A | 9/1997 | Beach et al. ................ 358/296 |
| 5,436,970 A | 7/1995 | Ray et al. | 5,671,282 A | 9/1997 | Wolff et al. ................. 713/179 |
| 5,446,488 A | 8/1995 | Vogel | 5,673,316 A | 9/1997 | Auerbach et al. ............. 705/51 |
| 5,450,122 A | 9/1995 | Keene | 5,687,236 A | 11/1997 | Moskowitz et al. .......... 380/28 |
| 5,450,490 A | 9/1995 | Jensen et al. | 5,694,471 A | 12/1997 | Chen et al. |
| 5,461,426 A | 10/1995 | Limberg et al. | 5,710,636 A | 1/1998 | Curry ........................ 358/3.28 |
| 5,463,209 A | 10/1995 | Figh ........................... 235/383 | 5,719,939 A | 2/1998 | Tel ............................. 713/179 |
| 5,469,222 A | 11/1995 | Sprague ....................... 348/580 | 5,721,788 A | 2/1998 | Powell et al. |
| 5,469,506 A | 11/1995 | Berson et al. ............... 713/186 | 5,727,092 A * | 3/1998 | Sandford et al. ............ 382/251 |
| 5,471,533 A | 11/1995 | Wang et al. | 5,735,547 A | 4/1998 | Morelle et al. ............... 283/67 |
| 5,473,631 A | 12/1995 | Moses | 5,740,244 A | 4/1998 | Indeck et al. |
| 5,479,168 A | 12/1995 | Johnson et al. | 5,742,845 A | 4/1998 | Wagner ...................... 395/821 |
| 5,481,294 A | 1/1996 | Thomas et al. | 5,745,604 A | 4/1998 | Rhoads ....................... 382/232 |
| 5,488,664 A | 1/1996 | Shamir | 5,748,763 A | 5/1998 | Rhoads |
| 5,490,217 A | 2/1996 | Wang et al. | 5,751,854 A | 5/1998 | Saitoh et al. |
| 5,493,677 A | 2/1996 | Bfalogh .................... 707/104.1 | 5,760,386 A | 6/1998 | Ward |
| 5,495,581 A | 2/1996 | Tsai ........................... 707/526 | 5,761,686 A | 6/1998 | Bloomberg ................. 707/529 |
| 5,496,071 A | 3/1996 | Walsh .......................... 283/70 | 5,768,426 A | 6/1998 | Rhoads |
| 5,499,294 A | 3/1996 | Friedman | 5,778,102 A | 7/1998 | Sandford, II et al. ....... 382/251 |
| 5,502,576 A | 3/1996 | Ramsay et al. ............. 358/444 | 5,787,186 A | 7/1998 | Schroeder |
| 5,515,081 A | 5/1996 | Vasilik | 5,790,693 A | 8/1998 | Graves et al. .............. 382/135 |
| 5,521,722 A | 5/1996 | Colvill et al. ............... 358/500 | 5,790,697 A | 8/1998 | Munro et al. ............... 382/135 |
| 5,524,933 A | 6/1996 | Kunt et al. | 5,799,092 A | 8/1998 | Kristol et al. |
| 5,530,751 A | 6/1996 | Morris | 5,804,803 A | 9/1998 | Cragun et al. .............. 235/375 |
| 5,530,759 A | 6/1996 | Braudaway et al. .......... 380/54 | 5,809,160 A | 9/1998 | Powell et al. |
| 5,530,852 A | 6/1996 | Meske, Jr. et al. .......... 709/206 | 5,809,317 A | 9/1998 | Kogan et al. ............. 707/501.1 |
| 5,532,920 A | 7/1996 | Hartrick et al. | 5,817,205 A | 10/1998 | Kaule ........................ 382/294 |
| 5,537,223 A | 7/1996 | Curry | 5,818,441 A | 10/1998 | Throckmorton et al. .... 345/717 |
| 5,539,471 A | 7/1996 | Myhrvold et al. | 5,819,289 A | 10/1998 | Sanford, II et al. ...... 707/104.1 |
| 5,539,735 A | 7/1996 | Moskowitz | 5,822,436 A | 10/1998 | Rhoads |
| 5,541,662 A | 7/1996 | Adams et al. | 5,825,871 A | 10/1998 | Mark .................... 379/357.03 |

| | | | | | |
|---|---|---|---|---|---|
| 5,825,892 A | 10/1998 | Braudaway et al. ........... 380/51 | 6,246,777 B1 | 6/2001 | Agarwal et al. |
| 5,838,458 A | 11/1998 | Tsai ........................... 358/402 | 6,266,430 B1 | 7/2001 | Rhoads et al. ............... 382/100 |
| 5,838,814 A | 11/1998 | Moore | 6,272,176 B1 | 8/2001 | Srinivasan |
| 5,841,886 A | 11/1998 | Rhoads | 6,272,634 B1 | 8/2001 | Tewfik et al. |
| 5,841,978 A | 11/1998 | Rhoads ........................ 709/217 | 6,275,599 B1 | 8/2001 | Adler et al. |
| 5,848,144 A | 12/1998 | Ahrens ........................ 379/219 | 6,285,775 B1 | 9/2001 | Wu et al. |
| 5,848,413 A | 12/1998 | Wolff ........................... 707/10 | 6,285,776 B1 | 9/2001 | Rhoads |
| 5,852,673 A | 12/1998 | Young ........................ 382/164 | 6,289,108 B1 | 9/2001 | Rhoads |
| 5,857,038 A | 1/1999 | Owada et al. ............... 382/284 | 6,292,092 B1 | 9/2001 | Chow et al. |
| 5,862,218 A | 1/1999 | Steinberg .................... 713/176 | 6,301,360 B1 | 10/2001 | Bocionek et al. |
| 5,862,260 A | 1/1999 | Rhoads ........................ 382/232 | 6,311,214 B1 | 10/2001 | Rhoads ........................ 709/277 |
| 5,864,622 A | 1/1999 | Marcus | 6,314,192 B1 | 11/2001 | Chen et al. |
| 5,869,819 A | 2/1999 | Knowles et al. ............. 235/375 | 6,314,457 B1 | 11/2001 | Schena et al. |
| 5,871,615 A | 2/1999 | Harris ........................ 162/140 | 6,321,648 B1 | 11/2001 | Berson et al. |
| 5,872,589 A | 2/1999 | Morales ........................ 725/24 | 6,321,981 B1 | 11/2001 | Ray et al. |
| 5,875,249 A | 2/1999 | Mintzer et al. ............... 380/54 | 6,324,574 B1 | 11/2001 | Gong ........................ 709/218 |
| 5,892,900 A | 4/1999 | Ginter et al. | 6,332,031 B1 | 12/2001 | Rhoads et al. |
| 5,893,101 A | 4/1999 | Balogh et al. ............... 707/100 | 6,332,194 B1 | 12/2001 | Bloom et al. |
| 5,898,779 A | 4/1999 | Squilla et al. ............... 713/176 | 6,334,187 B1 | 12/2001 | Kadono |
| 5,900,608 A | 5/1999 | Iida ............................. 235/381 | 6,343,138 B1 | 1/2002 | Rhoads |
| 5,902,353 A | 5/1999 | Reber et al. ................. 709/219 | 6,343,204 B1 | 1/2002 | Yang |
| 5,903,729 A | 5/1999 | Reber et al. ................. 709/219 | 6,345,104 B1 | 2/2002 | Rhoads |
| 5,905,248 A | 5/1999 | Russell et al. ......... 235/462.15 | 6,359,985 B1 | 3/2002 | Koch et al. |
| 5,905,251 A | 5/1999 | Knowles ................ 235/472.01 | 6,398,245 B1 | 6/2002 | Gruse et al. |
| 5,905,800 A | 5/1999 | Moskowitz et al. | 6,418,232 B1 | 7/2002 | Nakano et al. |
| 5,905,810 A | 5/1999 | Jones et al. .................. 382/135 | 6,425,081 B1 | 7/2002 | Iwamura |
| 5,907,149 A | 5/1999 | Marckini | 6,427,020 B1 | 7/2002 | Rhoads |
| 5,912,974 A | 6/1999 | Holloway et al. | 6,427,140 B1 | 7/2002 | Ginter et al. |
| 5,913,210 A | 6/1999 | Call ............................... 707/4 | 6,439,465 B1 | 8/2002 | Bloomberg |
| 5,915,027 A | 6/1999 | Cox et al. ..................... 380/54 | 6,456,726 B1 | 9/2002 | Yu et al. |
| 5,919,730 A | 7/1999 | Gasper et al. | 6,487,301 B1 | 11/2002 | Zhao |
| 5,930,767 A | 7/1999 | Reber et al. ................... 705/26 | 6,505,779 B1 | 1/2003 | Power et al. |
| 5,932,863 A | 8/1999 | Rathus et al. .......... 235/462.15 | 6,512,837 B1 | 1/2003 | Ahmed |
| 5,933,798 A | 8/1999 | Linnartz | 6,542,618 B1 | 4/2003 | Rhoads |
| 5,933,829 A | 8/1999 | Durst et al. ................... 707/10 | 6,556,690 B1 | 4/2003 | Nelson |
| 5,938,726 A | 8/1999 | Reber et al. ................. 709/217 | 6,577,746 B1 | 6/2003 | Evans et al. |
| 5,938,727 A | 8/1999 | Ikeda ........................ 709/218 | 6,580,819 B1 | 6/2003 | Rhoads |
| 5,939,695 A | 8/1999 | Nelson ........................ 235/383 | 6,636,615 B1 | 10/2003 | Rhoads et al. |
| 5,940,595 A | 8/1999 | Reber et al. ................. 709/227 | 6,718,046 B2 | 4/2004 | Reed et al. |
| 5,943,422 A | 8/1999 | Van Wie et al. | 6,721,440 B2 | 4/2004 | Reed et al. |
| 5,949,055 A | 9/1999 | Fleet et al. .................. 235/469 | 2001/0008557 A1 | 7/2001 | Stefik et al. |
| 5,950,173 A | 9/1999 | Perkowski .................... 705/26 | 2001/0017709 A1 | 8/2001 | Murakami et al. |
| 5,951,055 A | 9/1999 | Mowry, Jr. | 2001/0020270 A1 | 9/2001 | Yeung et al. |
| 5,963,916 A | 10/1999 | Kaplan ........................ 705/26 | 2001/0021144 A1 | 9/2001 | Oshima et al. |
| 5,971,277 A | 10/1999 | Cragun et al. ......... 235/462.01 | 2001/0024510 A1 | 9/2001 | Iwamura |
| 5,974,141 A | 10/1999 | Saito ............................ 705/52 | 2001/0026377 A1 | 10/2001 | Ikegami |
| 5,974,548 A | 10/1999 | Adams | 2001/0026629 A1 | 10/2001 | Oki |
| 5,978,773 A | 11/1999 | Hudetz et al. ................. 705/23 | 2001/0028725 A1 | 10/2001 | Nakagawa et al. |
| 5,979,757 A | 11/1999 | Tracy et al. ................. 235/383 | 2001/0028727 A1 | 10/2001 | Naito et al. |
| 5,983,218 A | 11/1999 | Syeda-Mahmoo ............. 707/3 | 2001/0030759 A1 | 10/2001 | Hayashi et al. |
| 5,991,426 A | 11/1999 | Cox et al. ................... 382/100 | 2001/0037455 A1 | 11/2001 | Lawandy et al. |
| 6,005,501 A | 12/1999 | Wolosewicz ................ 341/52 | 2001/0047478 A1 | 11/2001 | Mase |
| 6,024,287 A | 2/2000 | Takai et al. | 2001/0051996 A1 | 12/2001 | Cooper et al. |
| 6,026,193 A | 2/2000 | Rhoads | 2001/0052076 A1 | 12/2001 | Kadono |
| 6,035,177 A | 3/2000 | Moses et al. ................. 725/22 | 2001/0053235 A1 | 12/2001 | Sato |
| 6,052,486 A | 4/2000 | Knowlton et al. ........... 382/232 | 2001/0053299 A1 | 12/2001 | Matsunoshita et al. |
| 6,064,764 A | 5/2000 | Bhaskaran et al. | 2001/0054144 A1 | 12/2001 | Epstein et al. |
| 6,065,119 A | 5/2000 | Sandford, II et al. | 2002/0001095 A1 | 1/2002 | Kawakami et al. |
| 6,081,827 A | 6/2000 | Reber et al. | 2002/0003891 A1 | 1/2002 | Hoshino |
| 6,104,812 A | 8/2000 | Koltai et al. | 2002/0009208 A1 | 1/2002 | Alattar et al. ............... 382/100 |
| 6,122,403 A | 9/2000 | Rhoads | 2002/0010684 A1 | 1/2002 | Moskowitz |
| 6,166,750 A | 12/2000 | Negishi ........................ 347/131 | 2002/0015509 A1 | 2/2002 | Nakamura et al. |
| 6,185,683 B1 | 2/2001 | Ginter et al. | 2002/0018228 A1 | 2/2002 | Torigoe |
| 6,188,787 B1 | 2/2001 | Ohmae et al. | 2002/0023148 A1 | 2/2002 | Ritz et al. |
| 6,226,387 B1 | 5/2001 | Tewfik et al. | 2002/0023218 A1 | 2/2002 | Lawandy et al. |
| 6,233,347 B1 | 5/2001 | Chen et al. | 2002/0033844 A1 | 3/2002 | Levy et al. |
| 6,233,684 B1 | 5/2001 | Stefik et al. | 2002/0037091 A1 | 3/2002 | Terasaki |
| 6,237,786 B1 | 5/2001 | Ginter et al. | 2002/0037093 A1 | 3/2002 | Murphy |
| 6,240,121 B1 | 5/2001 | Senoh | 2002/0051237 A1 | 5/2002 | Ohara |
| 6,243,480 B1 | 6/2001 | Zhao et al. | 2002/0057431 A1 | 5/2002 | Fateley et al. |
| 6,246,775 B1 | 6/2001 | Nakamura et al. | 2002/0061121 A1 | 5/2002 | Rhoads et al. |

| | | | |
|---|---|---|---|
| 2002/0061122 A1 | 5/2002 | Fujihara et al. | |
| 2002/0064298 A1 | 5/2002 | Rhoads et al. | |
| 2002/0064759 A1 | 5/2002 | Durbin et al. | |
| 2002/0067914 A1 | 6/2002 | Schumann et al. | |
| 2002/0068987 A1 | 6/2002 | Hars | |
| 2002/0071556 A1 | 6/2002 | Moskowitz et al. | |
| 2002/0073317 A1 | 6/2002 | Hars | |
| 2002/0080396 A1 | 6/2002 | Silverbrook et al. | |
| 2002/0095577 A1 | 7/2002 | Nakamura et al. | |
| 2002/0097873 A1 | 7/2002 | Petrovic | |
| 2002/0097891 A1 | 7/2002 | Hinishi | |
| 2002/0105679 A1 | 8/2002 | Haynes | |
| 2002/0112171 A1 | 8/2002 | Ginter et al. | |
| 2002/0114458 A1 | 8/2002 | Belenko et al. | |
| 2002/0122568 A1 | 9/2002 | Zhao | |
| 2002/0176114 A1 | 11/2002 | Zeller et al. | |

FOREIGN PATENT DOCUMENTS

| | | | |
|---|---|---|---|
| EP | 411 232 | 2/1991 | |
| EP | 418 964 A1 | 3/1991 | |
| EP | 441 702 | 8/1991 | |
| EP | 493 091 | 7/1992 | |
| EP | 493091 | 7/1992 | |
| EP | 058 482 | 8/1992 | |
| EP | 551 016 | 7/1993 | |
| EP | 581 317 | 2/1994 | |
| EP | 605 208 | 7/1994 | |
| EP | 629 972 | 12/1994 | |
| EP | 649 074 | 4/1995 | |
| EP | 705 025 | 4/1996 | |
| EP | 711061 | 5/1996 | |
| EP | 0789480 | 8/1997 | |
| EP | 872995 | 10/1998 | |
| EP | 642060 | 4/1999 | |
| EP | 0642060 B1 | 4/1999 | |
| EP | 975147 | 1/2000 | |
| EP | 991047 | 4/2000 | |
| EP | 1041815 | 10/2000 | |
| EP | 1077570 | 2/2001 | |
| EP | 1122939 | 8/2001 | |
| EP | 1202250 | 5/2002 | |
| GB | 2063018 | 5/1981 | |
| GB | 2067871 | 7/1981 | |
| GB | 2196167 | 4/1988 | |
| GB | 2204984 | 11/1988 | |
| GB | 2346110 | 8/2000 | |
| JP | 3185585 | 8/1991 | |
| JP | 4-248771 | 2/1992 | |
| JP | 5/242217 | 9/1993 | |
| JP | 7108786 | 4/1995 | |
| JP | 8-30759 | 2/1996 | |
| WO | WO 89/08915 | 9/1989 | |
| WO | WO 93/25038 | 12/1993 | |
| WO | WO94/27228 | 11/1994 | |
| WO | WO95/04665 | 2/1995 | |
| WO | WO95/10813 | 4/1995 | |
| WO | WO 95/10835 | 4/1995 | |
| WO | WO95/13597 | 5/1995 | |
| WO | WO 95/14289 | 5/1995 | |
| WO | WO 95/20291 | 7/1995 | |
| WO | WO 96/26494 | 8/1996 | |
| WO | WO 96/27259 | 9/1996 | |
| WO | WO97/43736 | 11/1997 | |
| WO | WO98/14887 | 4/1998 | |
| WO | WO9820411 | 5/1998 | |
| WO | WO98/20642 | 5/1998 | |
| WO | WO98/24050 | 6/1998 | |
| WO | WO98/40823 | 9/1998 | |
| WO | WO98/49813 | 11/1998 | |
| WO | WO99/34277 | 7/1999 | |
| WO | WO99/36876 | 7/1999 | ................. 382/100 |
| WO | WO00/44131 | 7/2000 | |
| WO | WO0105075 | 1/2001 | |
| WO | WO 01/08405 | 2/2001 | |
| WO | WO0139121 | 5/2001 | |
| WO | WO0173997 | 10/2001 | |
| WO | WO0176253 | 10/2001 | |
| WO | WO 01/80169 | 10/2001 | ................. 382/100 |
| WO | WO01197128 | 12/2001 | |
| WO | WO0207425 | 1/2002 | |
| WO | WO0207442 | 1/2002 | |
| WO | WO0217631 | 2/2002 | |
| WO | WO0219589 | 3/2002 | |
| WO | WO0225599 | 3/2002 | |
| WO | WO0237309 | 5/2002 | |
| WO | WO0256264 | 7/2002 | |

OTHER PUBLICATIONS

Chow et al., "Forgery and Tamper–Proof Identification Document," IEEE Proc. 1993 Int. Carnahan Conf. on Security Technology, Oct. 13–15, 1993, pp. 11–14.

Cox et al., "Secure Spread Spectrum Watermarking for Images, Audio, and Video," IEEE1996, pp. 243–246.

Dautzenberg, "Watermarking Images," Department of Microelectronics and Electrical Engineering, Trinity College Dublin, 47 pages, Oct. 1994.

Dittmann, J., "Chapter 3: Telltale Watermarking," in Multiresolution Digital Watermarking: Algorithms and Implications for Multimedia Signals, Ph.D. thesis at Univ. of Toronto, 1999, pp. 23–52.

Dittmann, J. et al., "Content–based Digital Signature for Motion Pictures Authentication and Content–Fragile Watermarking," IEEE Proc. Int. Conf. on Multimedia Computing and Systems, Jun. 1999, pp. 209–213.

EMI "Screening Content from Compact Discs: ID Trac," SDMII Jun. 3, 1999, 13 pages.

Fleet et al., "Embedding Invisible Information in Color Images," Proc. Int. Conf. on Image Processing, vol. 1, pp. 532–535, Oct., 1997.

Kawaguchi et al., "Principle and Applications of BPCS–Steganography," Proc. SPIE vol. 3528: Multimedia Systems and Applications, Nov. 2–4, 1998, pp. 464–473.

Komatsu et al., "Authentication System Using Concealed Image in Telematics," Memoirs of the School of Science & Engineering, Waseda Univ., No. 52, 1988, pp. 45–60.

Komatsu et al., "A Proposal on Digital Watermarking in Document Image Communication and Its Application to Realizing a Signature," Electronics and Communications in Japan, Part I, vol., 73, No. 5, 1990, pp. 22–23.

Kundur et al., "A Robust Digital Image Watermarking Method and Wavelet–Based Fusion," IEEE Jul. 1997, pp. 544,547.

Lamy, P. et al., "Content–Based Watermarking for Image Authentication," Proc. 3.sup.rd Int. Workshop on Information Hiding, Sep./Oct. 1999, pp. 187–198.

Lin, C.–Y. et al., "Generating Robust Digital Signature for Image/Video Authentication," Proc. Multimedia and Security Workshop at ACM Multimedia'98, Sep. 1998, pp. 49–54.

Lin, C.–Y. et al., "Issues and Solutions for Authenticating MPEG Video," Proc. SPIE vol. 3657: Security and Watermarking of Multimedia Contents, Jan. 1999, pp. 54–65.

Schneider, M., "A Robust Content Based Digital Signature for Image Authentication," IEEE Proc. Int. Conf. on Image Processing, Sep. 1996, pp. 227–230 (vol. 3).

Seybold Report on desktop Publishing, "Holographic Signatures for Digital Images," Aug., 1995, 1 page.

Sharma et al., "Practical Challenges For Digital Watermarking Applications", May 3, 2001, pp. 1–10.

Szepanski, "A Signal Theoretic Method for Creating Forgery–Proof Documents for Automatic Verification," Proceedings 1979 Carnahan Conference on Crime Countermeasures, May 16, 1979, pp. 101–109.

Szepanski, "Additive Binary Data Transmission for Video Signals," Conference of the Communications Engineering Society, 1980, NTG Technical Reports, vol. 74, pp. 343–351. (German text and English translation enclosed).

van Schyndel et al., "Towards a Robust Digital Watermark," ACCV '95, vol. 2, Dec., 1995, pp. 504–508.

Xie, L. et al., "Secure MPEG Video Communications by Watermarking," Proc. Conf. of ATIRP (Advanced Telecommunications and Information Distribution Research Project), Feb. 1999, pp. 459–462.

Yeung et al., "Digital Watermarks: Shedding Light on the Invisible," Nov.–Dec. 1998, IEEE Micro vol. 18, No. 6, pp. 32–41.

Brassil et al., Electronic Marking and Identification Techniques to Discourage Document Copying, Proceedings of INFOCOM '94 Conference on Computer, IEEE Commun. Soc Conference, Jun. 12–16, 1994, 1278–1287.

Bruckstein, A.M.; Richardson, T.J., A holographic transform domain image watermarking method, Circuits, Systems, and Signal Processing vol. 17, No. 3 p. 361–89, 1998. This paper includes an appendix containing an internal memo of Bell Labs, which according to the authors of the paper, was dated Sep. 1994.

"High Water FBI Limited Presentation Image Copyright Protection Software," FBI Ltd brochure, Jul., 1995, 17 pages.

Koch et al., "Copyright Protection for Multimedia Data," Fraunhofer Institute for Computer Graphics, Dec. 16, 1994, 15 pages.

Koch et al., "Toward Robust and Hidden Image Copyright Labeling," Proc. of 1995 IEEE Workshop on Nonlinear Signal and Image Processing, Jun. 20–22, 1995, 4 pages.

Kurak et al., "A Cautionary Note On Image Downgrading," 1992 IEEE, pp. 153–159.

Mintzer et al., "Safeguarding Digital library Contents and Users" Digital Watermarking, D–Lib Magazine, Dec. 1997: ISSN 1082–9873.

Rindfrey, "Towards an Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages.

Schreiber et al., "A Compatible High–Definition Television System Using the Noise–Margin Method of Hiding Enhancement Information," SMPTE Journal, Dec. 1989, pp. 873–879.

SDMI Example Use Scenarios (Non–Exhaustive), Version 1.2, Jun. 16, 1999.

Szepanski, "Additive Binary Data Transmission for Video Signals," Papers Presented at Conf. Of Comm. Engineering Soc. Sep. 30–Oct. 3, 1980, Technical Reports vol. 74, pp. 342–352.

Tanaka et al., "A Visual Retrieval System with Private Information for Image Database," Proceeding International Conference on DSP Applications and Technology, Oct. 1991, pp. 415–421.

Tanaka et al., "New Integrated Coding Schemes for Computer–Aided Facsimile," Proc. IEEE Int'l Conf. on Sys. Integration, Apr. 1990, pp. 275–281.

Tirkel et al, "Electronic Water Mark," DICTA–93, Macquarie University, Sydney, Australia, Dec., 1993, pp. 666–673.

Weber et al., "Correlative Image Registration," Seminars in Nuclear Medicine, vol. XXIV, No. 4, Oct., 1994, pp. 311–323.

Cookson, Chris, General Principles of Music Uses on Portable Devices, presented to SDMI, Mar. 5, 1999.

Winograd, J.M., "Audio Watermarking Architecture for Secure Digital Music Distribution," a Proposal to the SDMI Portable Devices Working Group, by Aris Technologies, Inc., Mar. 26, 1999.

Mintzer et al., "Safeguarding Digital Library Contents and Users: Digital Watermarking," D–Lib Magazine, Dec. 1997, 12 pages.

*Audio Watermarking Architectures for Secure Ditigal Music Distribution, A Proposal to the SDMI Portable Devices Working Group* by ARIS Technologies, Inc, Mar. 26, 1999, pp. 1–11.

*Audio Watermarking Architectures for Persistent Protection, Presentation to SDMI PDWG*, Mar. 29, 1999, J. Winograd, Aris Technologies, pp 1–16.

*Audio Watermarking System to Screen Digital Audio Content for LCM Acceptance, A Proposal Submitted in Response to PDWG99050504–Transition CfP* by ARIS Technologies, Inc., May 23, 1999, Document Version 1.0, 15 pages.

Boland et al., "Watermarking Digital Images for Copyright Protection", *Fifth Int'l Conference on Image Processing and it's Application*, Jul. 1995, pp. 326–330.

Levy, "AIPL's Proposal for SDMI: An Underlying Security System" (slide presentation), Mar. 29, 1999, 23 slides.

*Microsoft Response to CfP for Technology Solutions to Screen Digital Audio Content for LCM Acceptance*, SDMI, PDWG Tokyo, May 23, 1999, 9 pages.

*Response to CfP for Technology Solutions to Screen Digital Audio Content for LCM Acceptance*, NTT Waveless Radio Consotium, May 23, 1999, 9 pages.

Sandford II et al., "The Data Embedding Method", *Proceedings of the SPIE* vol. 2615, pp. 226–259, 1996.

Thomas, Keith, *Screening Technology for Content from Compact Discs*, May 24, 1999, 11 pages.

Tirkel et al., "Electronic Water Mark," *Dicta–93*, Marquarie University, Sydney, Australia, Dec., 1993, pp. 666–672.

Vidal et al., "Non–Noticeable Information Embedding in Color Images: Marking and Detection", *IEEE* 1999, pp. 293–297.

Wolfgang et al., "A Watermark for Digital Images," *Computer Vision and Image Processing Laboratory*, Purdue University, Sep. 1996, pp. 219–222.

"Access Control and COpyright Protection for Images, WorkPackage 8: Watermarking," Jun. 30, 1995, 46 pages.

"Access Control and COpyright Protection for Images, WorkPackage 3: Evaluation of Existing Systems," Apr. 19, 1995, 68 pages.

"Access Control and COpyright Protection for Images, WorkPackage 1: Access Control and Copyright Protection for Images Need Evaluation," Jun., 1995, 21 pages.

"Access Control and COpyright Protection for Images, Conditional Access and Copyright Protection Based on the Use of Trusted Third Parties," 1995, 43 pages.

Arachelian, "White Noise Storm," Apr. 11, 1994, Internet reference, 13 pages.

Arazi, et al., "Intuition, Perception, and Secure Communication," IEEE Transactionson Systems, Man, and Cybernetics, vol. 19, No. 5, Sep./Oct. 1989, pp. 1016–1020.

Arthur, "Digital Fingerprints Protect Artwork," New Scientist, Nov. 12, 1994, p. 24.

Aura, "Invisible Communications," Helskinki University of Technology, Digital Systems Laboratory, Nov. 5, 1995, 13 pages.

Bender et al, "Techniques for Data Hiding," Draft Preprint, Private Correspondence, dated Oct. 30, 1995.

Bender et al., "Techniques for Data Hiding," Massachusetts Institute of Technology, Media Laboratory, Jan. 1995, 10 pages.

Boneh, "Collusion–Secure Fingerprinting for Digital Data," Department of Computer Science, Princeton University, 1995, 31 pages.

Boney et al., "Digital Watermarks for Audio Signals," Proceedings of Multimedia '96 1996 IEEE, pp. 473–480.

Boucqueau et al., Equitable Conditional Access and Copyright Protection for Image Based on Trusted Third Parties, Teleservices & Multimedia Communications, 2nd Int. Cost 237 Workshop, Second International Cost 237 Workshop, Nov., 1995; published 1996, pp. 229–243.

Brassil et al., "Hiding Information in Document Images," Nov., 1995, 7 pages.

Brown, "S–Tools for Windows, Version 1.00, .COPYRGT. 1994 Andy Brown, What is Steganography," Internet reference, Mar. 6, 1994, 6 pages.

Bruyndonckx et al., Neural Network Post–Processing of Coded Images Using Perceptual Maskin, 1994, 3 pages.

Bruyndonckx et al., "Spatial Method for Copyright Labeling of Digital Images," 1994, 6 pages.

Burgett et al., "A Novel Method for Copyright Labeling Digitized Image Data," requested by e–mail from author (unavailable/password protected on IGD WWW site); received Sep. 18, 1995, 12 pages.

Caronni, "Assuring Ownership Rights for Digital Images," Published in the Proceedings of 'Reliable IT Systems,' VIS '95, HH. Bruggemann and W. Gerhardt–Hackl (Ed.), Vieweg Publishing Company, Germany, 1995, Jun. 14, 1994, 10 pages.

Caruso, "Digital Commerce, 2 plans for watermarks, which can bind proof of authorship to electronic works." New York Times, Aug. 7, 1995, one page.

Castro et al., "Registration of Translated and Rotated Images Using Finite Fourier Transforms," IEEE Transactions on Pattern Analysis and Machine Intelligence, vol. PAMI–9, No. 5, Sep. 1987, pp. 700–703.

Choudhury, et al., "Copyright Protection for Electronic Publishing over Computer Networks," IEEE Network Magazine, Jun. 1994, 18 pages.

Clarke, "Invisible Code Tags Electronic Images," Electronic Engineering Times, Jun. 12, 1995, n. 852, p. 42.

"Copyright Protection for Digital Images, Digital Fingerprinting from FBI," Highwater FBI brochure, 1995, 4 pages.

"The Copyright Can of Worms Opened Up By The New Electronic Media," Computergram Internations, pCGN07170006, Jul. 17, 1995 and "The Copyright Can of Worms Opened Up By the New Electronic Media—2," Computergram Internations pCGN07210008, Jul. 21, 1995, 3 pages total.

Cox et al., "Secure Spread Spectrum Watermarking for Multimedia," NEC Research Institute Technical Report, Dec. 5, 1995, 33 pages.

Cox et al., "A Secure, Imperceptable Yet Perceptually Salient, Spread Spectrum Watermark for Multimedia," IEEE, Southcon/96, Conference Record, pp. 192–197, 1996.

"Cyphertech Systems: Introduces Digital Encoding Device to Prevent TV Piracy," Hollywood Reporter, Oct. 20, 1993, p. 23.

Delaigle et al., "Digital Watermarking," Proc. SPIE—Int. Soc. Opt. Eng., vol. 2659, pp. 99–110, 1996.

Delaigle et al., "A Psychovisual Approach for Digital Picture Watermarking," 1995, 20 pages.

DICE Digital Watermark System, Q&A, Dec., 1995, 12 pages.

Digimarc presentation at RSA Conference, approximately Jan. 17, 1996, 4 pages.

Fimmerstad, "The Virtual Art Museum," Ericsson Connexion, Dec., 1995, pp. 29–31.

Fitzgerald, "Invisible Digital Copyright ID," Editor & Publisher, Jun. 25, 1994, p. 62.

"Foiling Card Forgers With Magnetic 'Noise,'" Wall Street Journal, Feb. 8, 1994.

Frequently Asked Questions About Digimarc Signature Technology, Aug. 1, 1995, HPPT://WWW.DIGIMARC. COM, 9 pages.

Friedman, "The Trustworthy Digital Camera: Restoring Credibility to the Photographic Image," IEEE Transactions on Consumer Electronics, vol. 39, No. 4, Nov., 1993, pp. 905–910.

Gabor, et al., "Theory of Communication," J. Inst. Elect. Eng. 93, 1946, pp. 429–441.

Hartung et al., Digital Watermarking of Raw and Compressed Video, Proc. SPIE 2952, Digital Compression Technologies and Systems for Video Communications, Oct., 1996, pp 205–213.

Hecht, "Embedded Data Glyph Technology for Hardcopy Digital Documents," SPIE vol. 2171, Feb. 1994, pp. 341–352.

"Holographic signatures for digital images," The Seybold Report on Desktop Publishing, Aug. 1995, one page.

Humphrey, "Stamping Out Crime," Hollywood Reporter, Jan. 26, 1994, p. S48.

Jain, "Image Coding Via a Nearest Neighbors Image Model," IEEE Transactions on Communications, vol. COM–23, No. 3, Mar. 1975, pp. 318–331.

Johnson, "Steganography," Dec. 10, 1995, 32 pages.

JPEG Group's JPEG Software (release 4), FTP.CSU-A.BEREKELEY.EDU/PUB/CYPHERPUNKS/APPLICATIONS/ JSTEG/JPEG.ANNOUNCEMENT.GZ.

Kassam, Signal Detection in Non–Gaussain Noise, Dowden & Culver, 1988, pp. 1–96.

Koch et al., "Digital Copyright Labeling: Providing Evidence of Misuse and Tracking Unauthorized Distribution of Copyrighted Materials," Oasis Magazine, Dec. 1995, 3 pages.

Luc, "Analysis of Spread Spectrum System Parameters for Design of Hidden Transmission," Radioengineering, vol. 4, No. 2, Jun. 1995, pp. 26–29.

Machado, "Announcing Stego 1.0a2, The First Steganography Tool for the Macintosh," Internet reference, Nov. 28, 1993, 3 pages.

Macq, "Cryptology for Digital TV Broadcasting," Proceedings of the IEEE, vol. 83, No. 6, Jun. 1995, pp. 944–957.

Matthews, "When Seeing is Not Believing," New Scientist, Oct. 16, 1993, pp. 13–15.

Matsui et al., "Video–Steganography: How to Secretly Embed a Signature in a Picture," IMA Intellectual Property Project Proceedings, Jan. 1994, vol. 1, Issue 1, pp. 187–205.

Mintzer et al., "Toward on–line, Worldwide Access to Vatican Library Materials," IBM J. Res. Develop. vol. 40 No. 2, Mar., 1996, pp. 139–162.

Moller, et al., "Rechnergestutzte Steganographie: Wie sie Funktioniert und warum folglich jede Reglementierung von Verschlusselung unsinnig ist," DuD, Datenschutz und Datensicherung, Jun. 18, 1994 318–326.

"NAB—Cyphertech Starts Anti–Piracy Broadcast Tests," Newsbytes, NEW03230023, Mar. 23, 1994.

Nakamura et al., "A Unified Coding Method of Image and Text Data Using Discrete Orthogonal Transform," Systems and Computers in Japan, vol. 21, No. 3, 1990, pp. 87–92.

Nakamura et al., "A Unified Coding Method of Dithered Image and Text Data Using Micropatterns," Electronics and Communications in Japan, Part 1, vol. 72, No. 4, 1989, pp. 50–56.

New Product Information, "FBI at AppleExpo" (Olympia, London), Nov., 1995, 2 pages.

Ohnishi et al., Embedding a Seal into a Picture Under Orthogonal Wavelet Transform, Proceedings of Multimedia '96, 1996, IEEE, pp. 514–421.

ORuanaidh et al., "Watermarking Digital Images for Copyright Protection," http://www.kalman.mee.tcd.ie/people/jjr/eva.sub.—pap.html, Feb. 2, 1996, 8 pages. (Also published Aug., 1996, IEE Proceedings–Vision, Image and Signal Processing, vol. 143, No. 4, pp. 250–256.).

Pennebaker et al., JPEG Still Image Data Compression Standard, Chapter 3, "Aspects of the Human Visual System," pp. 23–27, 1993, Van Nostrand Reinhold, New York.

Pickholtz et al., "Theory of Spread–Spectrum Communications—A Tutorial," Transactions on Communications, vol. COM–30, No. 5, May, 1982, pp. 855–884.

Pitas et al., "Applying Signatures on Digital Images," IEEE Workshop on Nonlinear Image and Signal Processing, Neos Marmaras, Greece, pp. 460–463, Jun., 1995.

Port, "Halting Highway Robbery on the Internet," Business Week, Oct. 17, 1994, p. 212.

Roberts, "Picture Coding Using Pseudorandom Noise," IRE Trans. on Information Theory, vol. 8, No. 2, Feb., 1962, pp. 145–154.

Sapwater et al., "Electronic Copyright Protection," Photo>Electronic Imaging, vol. 37, No. 6, 1994, pp. 16–21.

Schneier, "Digital Signatures, Cryptographic Algorithms Can Create Nonforgeable Signatures for Electronic Documents, Making Them Valid Legal Instruments" BYTE, Nov. 1993, pp. 309–312.

shaggy@phantom.com, "Hide and Seek v. 4.0," Internet reference, Apr. 10, 1994, 3 pages.

Short, "Steps Toward Unmasking Secure Communications," International Journal of Bifurcation and Chaos, vol. 4, No. 4, 1994, pp. 959–977.

Simmons, "Subliminal Channels; Past and Present," ETT, vol. 5, No. 4, Jul.–Aug. 1994, pp. 45–59.

Sheng et al., "Experiments on Pattern Recogntion Using Invariant Fourier–Mellin Descriptors," Journal of Optical Society of America, vol. 3, No. 6, Jun., 1986, pp. 771–776.

Sklar, "A Structured Overview of Digital Communications—a Tutorial Review—Part I," IEEE Communications Magazine, Aug., 1983, pp. 1–17.

Sklar, "A Structured Overview of Digital Communications—a Tutorial Review—Part II," IEEE Communications Magazine, Oct., 1983, pp. 6–21.

"Steganography," Intellectual Property and the National Information Infrastructure The Report of the Working Group on Intellectual Property Rights, Sep. 1995, pp. 212–213.

Tanaka et al., "Embedding Secret Information Into a Dithered Multi–Level Image," Proc. IEEE Military Comm. Conf., Sep. 1990, pp. 216–220.

Tanaka, "Embedding the Attribute Information Into a Dithered Image," Systems and Computers in Japan, vol. 21, No. 7, 1990, pp. 43–50.

Tirkel et al., "A Two–Dimensional Digital Watermark," 1995, 6 pages.

Toga et al., "Registration Revisited," Journal of Neuroscience Methods, 48 (1993), pp. 1–13.

Wagner, "Fingerprinting," 1983 IEEE, pp. 18–22.

Walton, "Image Authentication for a Slippery New Age," Dr. Dobb's Journal, Apr. 1995, pp. 18–26, 82–87.

"Watermarking & Digital Signature: Protect Your Work!" Published on Internet 1996, http://Itswww.epfl.ch/.about.jordan/watermarking.html.

Wise, "The History of Copyright, Photographers' Rights Span Three Centuries," Photo>Electronic Imaging, vol. 37, No. 6, 1994.

van Schyndel et al., "A Digital Watermark," IEEE International Conference on Image Processing, Nov. 13–16, 1994, pp. 86–90.

Zhao et al., "Embedding Robust Labels Into Images for Copyright Protection," Proc. of the International Congress on Intellectual Property Rights for Specialized Information, Knowledge and New Technologies (Vienna, Austria) Aug. 21–25, 1995, 10 pages.

Bender, "Applications for Data Hiding," IBM Systems Journal, vol. 39, No. 3–4, pp. 547–568, 2000.

Gruhl et al., "Information Hiding to Foil the Casual Counterfeiter," Proc. 2d Information Hiding Workshop, LNCS vol. 1525, pp. 1–15 (Apr. 15, 1998).

* cited by examiner

METHODS EMPLOYING MULTIPLE WATERMARKS

RELATED APPLICATION DATA

This application is a divisional of application Ser. No. 09/498,223, filed Feb. 3, 2000 now U.S. Pat. No. 6,574,350. The Ser. No. 09/498,223 application is a continuation-in-part of application Ser. No. 09/287,940, filed Apr. 7, 1999 now U.S. Pat. No. 6,580,819, which claims priority to abandoned application Ser. No. 60/082,228, filed Apr. 16, 1998. The Ser. No. 09/498,223 application is also a continuation of application Ser. No. 09/433,104, filed Nov. 3, 1999 now U.S. Pat. No. 6,636,615, which is a continuation-in-part of application Ser. No. 09/234,780 now abandoned, filed Jan. 20, 1999 (now U.S. Pat. No. 6,332,031), which claims priority to abandoned application Ser. No. 60/071,983, filed Jan. 20, 1998. These applications are incorporated herein by reference.

FIELD OF THE INVENTION

The present application relates to digital watermarking, and particularly relates to digital watermarking techniques employing both frail and robust watermarks.

BACKGROUND AND SUMMARY OF THE INVENTION

For expository convenience, the following discussion focuses on an exemplary application of the disclosed technology—encoding the images printed on banknotes with both frail and robust watermarks. As noted later, however, the technology also finds application beyond image watermarking, including in video and audio watermarking.

The problem of casual counterfeiting of banknotes first arose two decades ago, with the introduction of color photocopiers. A number of techniques were proposed to address the problem.

U.S. Pat. No. 5,659,628 (assigned to Ricoh) is one of several patents noting that photocopiers can be equipped to recognize banknotes and prevent their photocopying. The Ricoh patent particularly proposed that the red seal printed on Japanese yen notes is a pattern well-suited for machine recognition. U.S. Pat. No. 5,845,008 (assigned to Omron), and U.S. Pat. Nos. 5,724,154 and 5,731,880 (both assigned to Canon) show other photocopiers that sense the presence of the seal emblem on banknotes, and disable a photocopier in response.

Other technologies proposed that counterfeiting might be deterred by uniquely marking the printed output from each color photocopier, so that copies could be traced back to the originating machine. U.S. Pat. No. 5,568,268, for example, discloses the addition of essentially-imperceptible patterns of yellow dots to printed output; the pattern is unique to the machine. U.S. Pat. No. 5,557,742 discloses a related arrangement in which the photocopier's serial number is printed on output documents, again in essentially-imperceptible form (small yellow lettering). U.S. Pat. No. 5,661,574 shows an arrangement in which bits comprising the photocopier's serial number are represented in the photocopier's printed output by incrementing, or decrementing, pixel values (e.g. yellow pixels) at known locations by fixed amounts (e.g. +/−30), depending on whether the corresponding serial number bit is a "1" or a "0."

Recent advances in color printing technology have greatly increased the level of casual counterfeiting. High quality scanners are now readily available to many computer users, with 300 dpi scanners available for under $100, and 600 dpi scanners available for marginally more. Similarly, photographic quality color ink-jet printers are commonly available from Hewlett-Packard Co., Epson, etc. for under $300.

These tools pose new threats. For example, a banknote can be doctored (e.g. by white-out, scissors, or less crude techniques) to remove/obliterate the visible patterns on which prior art banknote detection techniques relied to prevent counterfeiting. Such a doctored document can then be freely scanned or copied, even on photocopiers designed to prevent processing of banknote images. The removed pattern(s) can then be added back in, e.g. by use of digital image editing tools, permitting free reproduction of the banknote.

In accordance with aspects of the present invention, these and other current threats are addressed by digitally watermarking banknotes, and equipping devices to sense such watermarks and respond accordingly.

(Watermarking is a quickly growing field of endeavor, with several different approaches. The present assignee's work is reflected in the earlier-cited related applications, as well as in U.S. Pat. Nos. 5,841,978, 5,748,783, 5,710,834, 5,636,292, 5,721,788, and laid-open PCT application WO97/43736. Other work is illustrated by U.S. Pat. Nos. 5,734,752, 5,646,997, 5,659,726, 5,664,018, 5,671,277, 5,687,191, 5,687,236, 5,689,587, 5,568,570, 5,572,247, 5,574,962, 5,579,124, 5,581,500, 5,613,004, 5,629,770, 5,461,426, 5,743,631, 5,488,664, 5,530,759,5,539,735, 4,943,973, 5,337,361, 5,404,160, 5,404,377, 5,315,098, 5,319,735, 5,337,362, 4,972,471, 5,161,210, 5,243,423, 5,091,966, 5,113,437, 4,939,515, 5,374,976, 4,855,827, 4,876,617, 4,939,515, 4,963,998, 4,969,041, and published foreign applications WO 98/02864, EP 822,550, WO 97/39410, WO 96/36163, GB 2,196,167, EP 777,197, EP 736,860, EP 705,025, EP 766,468, EP 782,322, WO 95/20291, WO 96/26494, WO 96/36935, WO 96/42151, WO 97/22206, WO 97/26733. Some of the foregoing patents relate to visible watermarking techniques. Other visible watermarking techniques (e.g. data glyphs) are described in U.S. Pat. Nos. 5,706,364, 5,689,620, 5,684,885, 5,680,223, 5,668,636, 5,640,647, 5,594,809.

Most of the work in watermarking, however, is not in the patent literature but rather in published research. In addition to the patentees of the foregoing patents, some of the other workers in this field (whose watermark-related writings can by found by an author search in the INSPEC database) include I. Pitas, Eckhard Koch, Jian Zhao, Norishige Morimoto, Laurence Boney, Kineo Matsui, A. Z. Tirkel, Fred Mintzer, B. Macq, Ahmed H. Tewfik, Frederic Jordan, Naohisa Komatsu, and Lawrence O'Gorman.

The artisan is assumed to be familiar with the foregoing prior art.

In the present disclosure it should be understood that references to watermarking encompass not only the assignee's watermarking technology, but can likewise be practiced with any other watermarking technology, such as those indicated above.

The physical manifestation of watermarked information most commonly takes the form of altered signal values, such as slightly changed pixel values, picture luminance, picture colors, DCT coefficients, instantaneous audio amplitudes, etc. However, a watermark can also be manifested in other ways, such as changes in the surface microtopology of a medium, localized chemical changes (e.g. in photographic emulsions), localized variations in optical density, localized changes in luminescence, etc. Watermarks can also be optically implemented in holograms and conventional paper watermarks.)

In accordance with an exemplary embodiment of the present invention, an object—such as a banknote image—is encoded with two watermarks. One is relatively robust, and withstands various types of corruption, and is detectable in the object even after multiple generations of intervening distortion. The other is relatively frail, so that it fails with the first distortion. If a version of the object is encountered having the robust watermark but not the frail watermark, the object can be inferred to have been processed, and thus not an original.

The foregoing and other features and advantages of the present invention will be more readily apparent from the following Detailed Description, which proceeds with reference to the accompanying drawings.

DETAILED DESCRIPTION

Watermarks in banknotes and other security documents (passports, stock certificates, checks, etc.—all collectively referred to as banknotes herein) offer great promise to reduce such counterfeiting, as discussed more fully below. Additionally, watermarks provide a high-confidence technique for banknote authentication.

Figure 1:
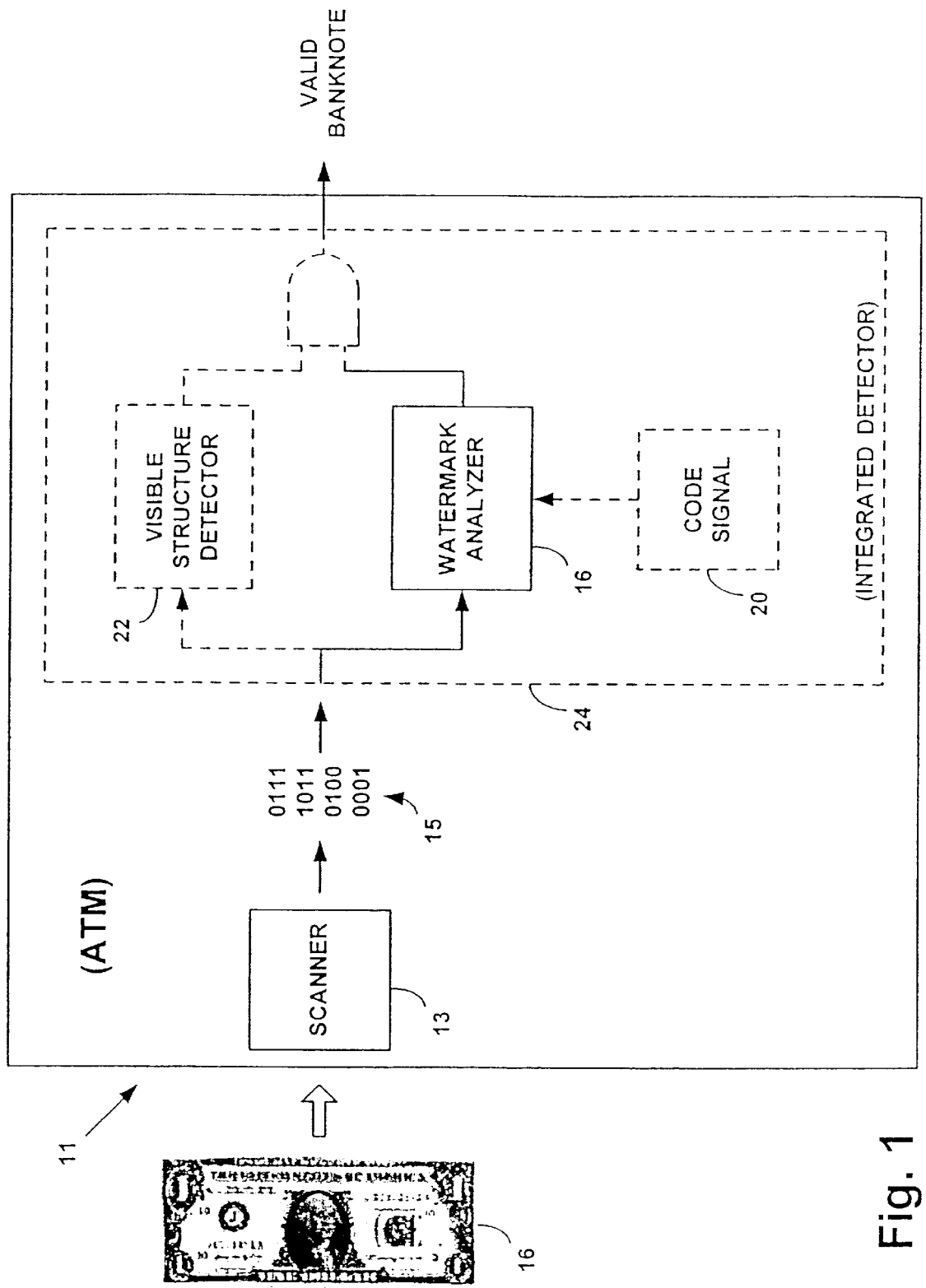
FIG. 1 shows part of an automatic teller machine employing principles of the present invention.

By way of example, consider an automatic teller machine that uses watermark data to provide high confidence authentication of banknotes, permitting it to accept—as well as dispense—cash. Referring to FIG. 1, such a machine (11) is provided with a known optical scanner (13) to produce digital data (15) corresponding to the face(s) of the bill (16). This image set (14) is then analyzed (16) to extract embedded watermark data. In watermarking technologies that require knowledge of a code signal (20) for decoding (e.g. noise modulation signal, crypto key, spreading signal, etc.), a bill may be watermarked in accordance with several such codes. Some of these codes are public—permitting their reading by conventional machines. Others are private, and are reserved for use by government agencies and the like. (C.f. public and private codes in the present assignee's issued patents.)

As noted, banknotes presently include certain visible structures, or markings (e.g., the seal emblem noted in the earlier-cited patents), which can be used as aids to note authentication (either by visual inspection or by machine detection). Desirably, a note is examined by an integrated detection system (24), for both such visible structures (22), as well as the present watermark-embedded data, to determine authenticity.

The visible structures can be sensed using known pattern recognition techniques. Examples of such techniques are disclosed in U.S. Pat. Nos. 5,321,773, 5,390,259, 5,533,144, 5,539,841, 5,583,614, 5,633,952, 4,723,149 and 5,424,807 and laid-open foreign application EP 766,449. The embedded watermark data can be recovered using the scanning/analysis techniques disclosed in the cited patents and publications.

Figure 2:
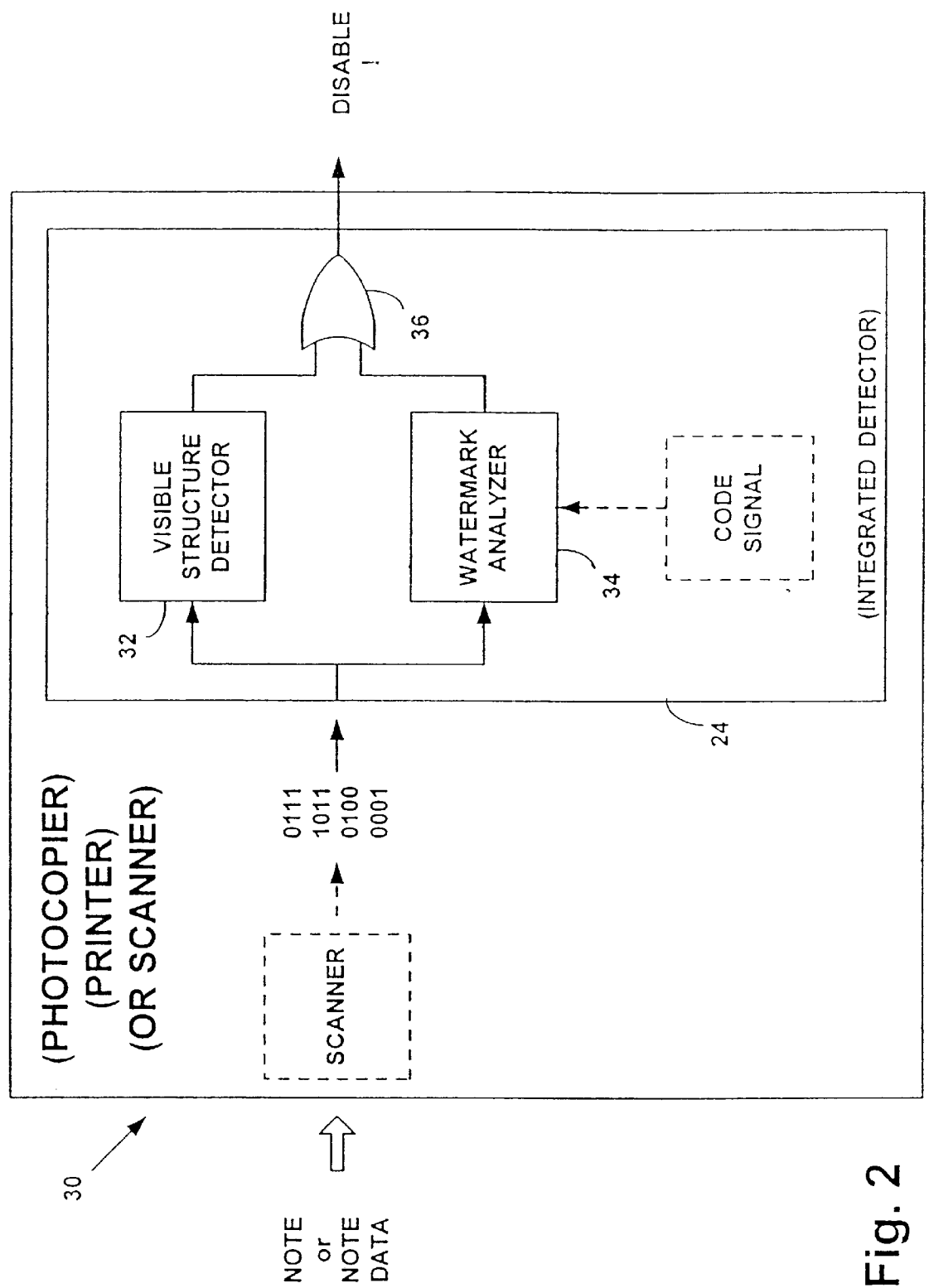
FIG. 2 shows part of a device (e.g. a photocopier, scanner, or printer) employing principles of the present invention.

To reduce counterfeiting, it is desirable that document-reproducing technologies recognize banknotes and refuse to reproduce same. Referring to FIG. 2, a photocopier (30), for example, can sense the presence of either a visible structure (32) or embedded banknote watermark data (34), and disable copying if either is present (36). Scanners and printers can be equipped with a similar capability—analyzing the data scanned or to be printed for either of these banknote hallmarks. If either is detected, the software (or hardware) disables further operation.

The watermark detection criteria provides an important advantage not otherwise available. As noted, an original bill can be doctored (e.g. by white-out, scissors, or less crude techniques) to remove/obliterate the visible structures. Such a document can then be freely copied on either a visible structure-sensing photocopier or scanner/printer installation. The removed visible structure can then be added in via a second printing/photocopying operation. If the printer is not equipped with banknote-disabling capabilities, image-editing tools can be used to insert visible structures back into image data sets scanned from such doctored bills, and the complete bill freely printed. By additionally including embedded watermark data in the banknote, and sensing same, such ruses will not succeed.

(A similar ruse is to scan a banknote image on a non-banknote-sensing scanner. The resulting image set can then be edited by conventional image editing tools to remove/obliterate the visible structures. Such a data set can then be printed—even on a printer/photocopier that examines such data for the presence of visible structures. Again, the missing visible structures can be inserted by a subsequent printing/photocopying operation.)

Desirably, the visible structure detector and the watermark detector are integrated together as a single hardware and/or software tool. This arrangement provides various economies, e.g., in interfacing with the scanner, manipulating pixel data sets for pattern recognition and watermark extraction, electronically re-registering the image to facilitate pattern recognition/watermark extraction, issuing control signals (e.g. disabling) signals to the photocopier/scanner, etc.

Figure 3:
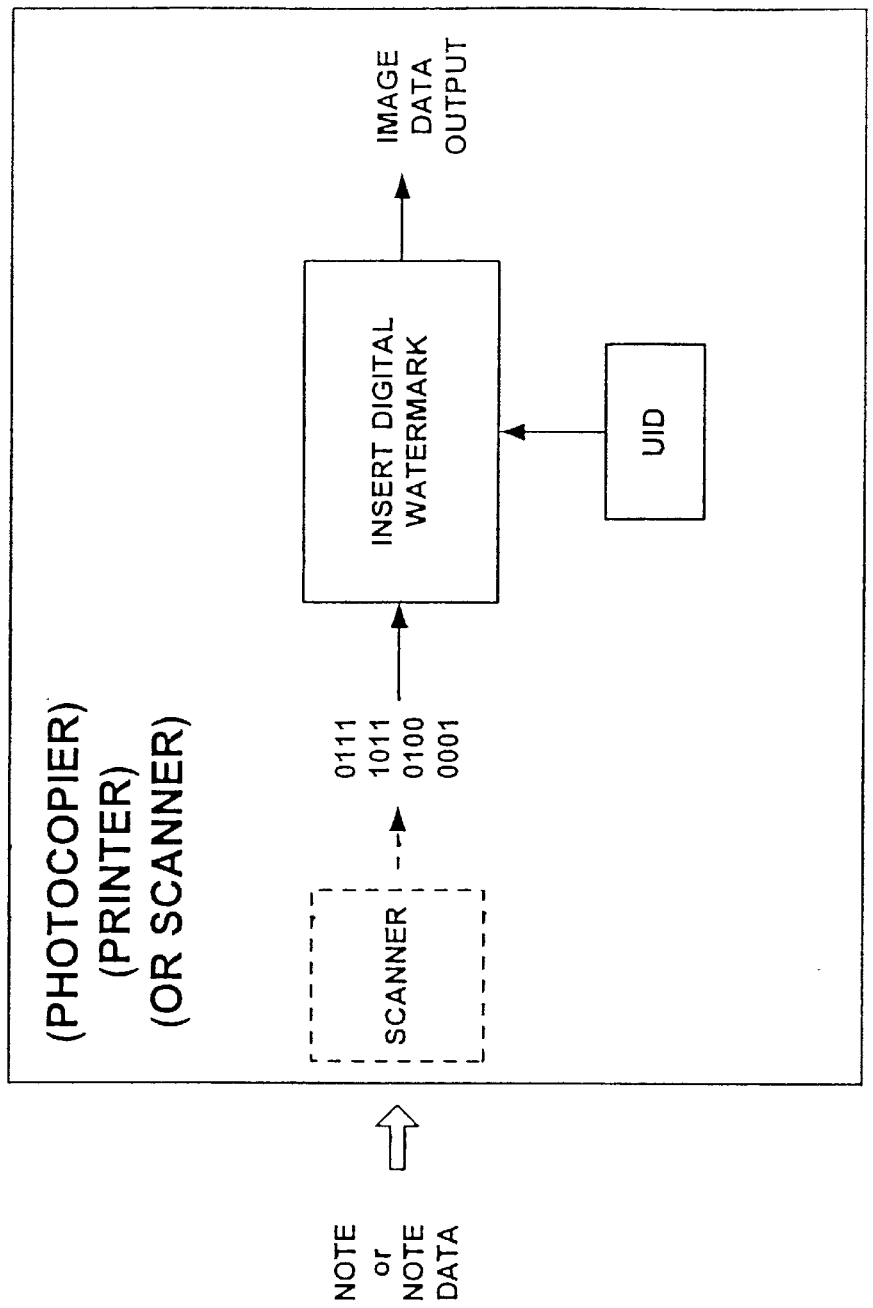
FIG. 3 shows part of another device employing principles of the present invention.

A related principle (FIG. 3) is to insert an imperceptible watermark having a universal ID (UID) into all documents printed with a printer, scanned with a scanner, or reproduced by a photocopier. The UID is associated with the particular printer/photocopier/scanner in a registry database maintained by the products' manufacturers. The manufacturer can also enter in this database the name of the distributor to whom the product was initially shipped. Still further, the owner's name and address can be added to the database when the machine is registered for warranty service. While not preventing use of such machines in counterfeiting, the embedded UID facilitates identifying the machine that generated a counterfeit banknote. (This is an application in which a private watermark might best be used.)

While the foregoing applications disabled potential counterfeiting operations upon the detection of either a visible structure or watermarked data, in other applications, both criteria must be met before a banknote is recognized as genuine. Such applications typically involve the receipt or acceptance of banknotes, e.g. by ATMs as discussed above and illustrated in FIG. 1.

The foregoing principles (employing just watermark data, or in conjunction with visible indicia) can likewise be used to prevent counterfeiting of tags and labels (e.g. the fake labels and tags commonly used in pirating Levis brand jeans, branded software, etc.)

The reader may first assume that banknote watermarking is effected by slight alterations to the ink color/density/distribution, etc. on the paper. This is one approach. Another is to watermark the underlying medium (whether paper, polymer, etc.) with a watermark. This can be done by changing the microtopology of the medium (a la mini-Braille) to manifest the watermark data. Another option is to employ a laminate on or within the banknote, where the laminate has the watermarking manifested thereon/therein. The laminate can be textured (as above), or its optical transmissivity can vary in accordance with a noise-like pattern that is the watermark, or a chemical property can similarly vary.

Another option is to print at least part of a watermark using photoluminescent ink. This allows, e.g., a merchant presented with a banknote, to quickly verify the presence of *some* watermark-like indicia in/on the bill even without resort to a scanner and computer analysis (e.g. by examining under a black light). Such photoluminescent ink can also print human-readable indicia on the bill, such as the denomination of a banknote. (Since ink-jet printers and other common mass-printing technologies employ cyan/magenta/yellow/black to form colors, they can produce only a limited spectrum of colors. Photoluminescent colors are outside their capabilities. Fluorescent colors—such as the yellow, pink and green dyes used in highlighting markers—can similarly be used and have the advantage of being visible without a black light.)

An improvement to existing encoding techniques is to add an iterative assessment of the robustness of the mark, with a corresponding adjustment in a re-watermarking operation. Especially when encoding multiple bit watermarks, the characteristics of the underlying content may result in some bits being more robustly (e.g. strongly) encoded than others. In an illustrative technique employing this improvement, a watermark is first embedded in an object. Next, a trial decoding operation is performed. A confidence measure (e.g. signal-to-noise ratio) associated with each bit detected in the decoding operation is then assessed. The bits that appear weakly encoded are identified, and corresponding changes are made to the watermarking parameters to bring up the relative strengths of these bits. The object is then watermarked anew, with the changed parameters. This process can be repeated, as needed, until all of the bits comprising the encoded data are approximately equally detectable from the encoded object, or meet some predetermined signal-to-noise ratio threshold.

The foregoing applications, and others, can generally benefit by multiple watermarks. For example, an object (physical or data) can be marked once in the spatial domain, and a second time in the spatial frequency domain. (It should be understood that any change in one domain has repercussions in the other. Here we reference the domain in which the change is directly effected.)

Another option is to mark an object with watermarks of two different levels of robustness, or strength. The more robust watermark withstands various types of corruption, and is detectable in the object even after multiple generations of intervening distortion. The less robust watermark can be made frail enough to fail with the first distortion of the object. In a banknote, for example, the less robust watermark serves as an authentication mark. Any scanning and reprinting operation will cause it to become unreadable. Both the robust and the frail watermarks should be present in an authentic banknote; only the former watermark will be present in a counterfeit.

Still another form of multiple-watermarking is with content that is compressed. The content can be watermarked once (or more) in an uncompressed state. Then, after compression, a further watermark (or watermarks) can be applied.

Still another advantage from multiple watermarks is protection against sleuthing. If one of the watermarks is found and cracked, the other watermark(s) will still be present and serve to identify the object.

The foregoing discussion has addressed various technological fixes to many different problems. Exemplary solutions have been detailed above. Others will be apparent to the artisan by applying common knowledge to extrapolate from the solutions provided above.

For example, the technology and solutions disclosed herein have made use of elements and techniques known from the cited references. Other elements and techniques from the cited references can similarly be combined to yield further implementations within the scope of the present invention. Thus, for example, holograms with watermark data can be employed in banknotes, single-bit watermarking can commonly be substituted for multi-bit watermarking, technology described as using imperceptible watermarks can alternatively be practiced using visible watermarks (glyphs, etc.), techniques described as applied to images can likewise be applied to video and audio, local scaling of watermark energy can be provided to enhance watermark signal-to-noise ratio without increasing human perceptibility, various filtering operations can be employed to serve the functions explained in the prior art, watermarks can include subliminal graticules to aid in image re-registration, encoding may proceed at the granularity of a single pixel (or DCT coefficient), or may similarly treat adjoining groups of pixels (or DCT coefficients), the encoding can be optimized to withstand expected forms of content corruption. Etc., etc., etc. Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art.

We claim:

1. A watermarking method to mark a security document comprising:

receiving first information;

receiving second information;

embedding the first information as a first digital watermark in data representing a first portion of the security document;

embedding the second information as a second digital watermark in data representing a second portion of the security document, wherein an original security document comprises both a first digital watermark and a second digital watermark, and wherein the first and second watermarks are provided so as to each react in a different manner when the security document is subjected to a predetermined process.

2. The method of claim 1 in which the first watermark is designed to withstand a predetermined process, and the second watermark is not.

3. The method of claim 2 in which the predetermined process includes scanning.

4. The method of claim 2 in which the predetermined process includes printing.

5. The method of claim 2 in which the predetermined process includes distortion.

6. The method of claim 1 in which the security document comprises an image.

7. The method of claim 6 in which the security document comprises a document printed with said image.

8. The method of claim 1 that further includes analyzing a suspect document for the presence of the second watermark, the absence of said second watermark indicating that the suspect document is not an original document.

9. The method of claim 1 in which the document includes plural data samples, each sample having a value, and the watermarking changes the values of at least certain of said samples.

10. The method of claim 9 in which said samples comprises pixels.

11. The method of claim 9 wherein the watermarking of at least the first watermark is effected by slight alterations to the sampled data's color.

12. The method of claim 11 in which the first watermark is designed to withstand a predetermined process, and the second watermark is not, wherein the predetermined process comprises at least scanning and reprinting.

13. A security document provide according to claim 1, wherein at least a portion of one of the first digital watermark and the second digital watermark is provided on the security document with photoluminescent ink.

14. The security document of claim 13 wherein the predetermined process comprises exposure to non-visible light.

15. The security document of claim 13 wherein the predetermined process comprises optical scanning.

16. A security document according to claim 1, wherein at least a portion of one of the first digital watermark and the second digital watermark is provided on the security document with fluorescing ink.

17. The security document of claim 16 wherein the predetermined process comprises exposure to non-visible light.

18. The security document of claim 16 wherein the predetermined process comprises optical scanning.

19. The method of claim 1, wherein the predetermined process comprises exposure to light.

20. A method of marking an object comprising:
receiving first information;
receiving second information;
embedding the first information with a first digital watermark in data representing a first portion of the object;
embedding the second information with a second digital watermark in data representing a second portion of the object, wherein
at least portions of the first and second watermarks are to be provided with a first ink and a second different ink, respectively, so that the first and second watermarks react in different manners when the object is subjected to a predetermined process.

21. A method comprising:
receiving data including the first digital watermark and the second digital watermark of claim 20;
providing at least portions of the first and second watermarks on an object with a first ink and a second different ink, respectively.

22. The method of claim 20 wherein the predetermined process comprises exposure to non-visible light.

23. The method of claim 20 wherein the predetermined process comprises optical scanning and printing.

* * * * *